(12) United States Patent
McDermot

(10) Patent No.: US 11,629,933 B2
(45) Date of Patent: Apr. 18, 2023

(54) ZOOM CELL

(71) Applicant: Sheltered Wings, Inc., Barneveld, WI (US)

(72) Inventor: Connor McDermot, Barneveld, WI (US)

(73) Assignee: SHELTERED WINGS, INC., Barneveld, WI (US)

( * ) Notice: Subject to any disclaimer, the term of this patent is extended or adjusted under 35 U.S.C. 154(b) by 0 days.

(21) Appl. No.: 17/149,086

(22) Filed: Jan. 14, 2021

(65) Prior Publication Data

US 2021/0381803 A1    Dec. 9, 2021

Related U.S. Application Data

(60) Provisional application No. 62/961,464, filed on Jan. 15, 2020.

(51) Int. Cl.
| | |
|---|---|
| *F41G 1/38* | (2006.01) |
| *G02B 23/00* | (2006.01) |
| *G02B 23/16* | (2006.01) |

(52) U.S. Cl.
CPC ............ *F41G 1/38* (2013.01); *G02B 23/145* (2013.01); *G02B 23/16* (2013.01)

(58) Field of Classification Search
CPC . G02B 23/14; G02B 7/10; G02B 7/04; G02B 23/145; G02B 15/16; G02B 15/163; G02B 23/16; G02B 23/00; F41G 1/38
See application file for complete search history.

(56) References Cited

U.S. PATENT DOCUMENTS

| | | | | | |
|---|---|---|---|---|---|
| 3,058,391 | A | * | 10/1962 | Leupold ................. | G02B 15/04 359/422 |
| 3,121,134 | A | * | 2/1964 | Heinzel ................. | G02B 23/145 359/422 |
| 3,445,155 | A | * | 5/1969 | Sturrock ................ | G03B 17/14 359/699 |
| 3,618,498 | A | * | 11/1971 | Eppinger ............... | G03B 13/20 356/10 |
| 3,744,884 | A | * | 7/1973 | Filipovich ............. | G02B 7/10 359/826 |
| 4,172,634 | A | * | 10/1979 | Thompson ............. | F41G 1/38 359/422 |

(Continued)

OTHER PUBLICATIONS

International Search Report and Written Opinion for International Application No. PCT/US21/13409 dated May 19, 2021, 10 pages.

(Continued)

*Primary Examiner* — Joshua E Freeman
(74) *Attorney, Agent, or Firm* — Husch Blackwell LLP

(57) ABSTRACT

A zoom cell has a main zoom cell body having a central axis, at least two fingers extending from the main zoom cell body parallel to the central axis, and at least two grooves separating the at least two fingers. A zoom cell system has at least two zoom cells disposed in an erector tube, with the fingers of the at least two zoom cells pointed towards one another, with the at least two zoom cells positioned such that the fingers of a first of the at least two zoom cells align so as to correspond with at least one of the at least two grooves of the other of the at least two zoom cells.

17 Claims, 20 Drawing Sheets

(56) References Cited

U.S. PATENT DOCUMENTS

| | | | | | |
|---|---|---|---|---|---|
| 5,583,595 | A * | 12/1996 | Hara | | G02B 7/102 |
| | | | | | 396/85 |
| 5,793,537 | A * | 8/1998 | Nomura | | G03B 9/24 |
| | | | | | 359/701 |
| 6,031,663 | A * | 2/2000 | Funatsu | | G02B 7/06 |
| | | | | | 359/422 |
| 6,195,212 | B1 * | 2/2001 | Miyamoto | | G02B 7/10 |
| | | | | | 359/699 |
| 6,449,108 | B1 * | 9/2002 | Bell | | F41G 1/38 |
| | | | | | 359/425 |
| 8,314,994 | B1 * | 11/2012 | Thomas | | G02B 23/145 |
| | | | | | 359/694 |
| 8,699,149 | B2 * | 4/2014 | Hasselbach | | F41G 1/38 |
| | | | | | 359/399 |
| 2010/0284081 | A1 * | 11/2010 | Gutierrez | | G03B 3/10 |
| | | | | | 359/554 |
| 2010/0309462 | A1 * | 12/2010 | Thomas | | G02B 23/145 |
| | | | | | 359/422 |
| 2013/0318853 | A1 * | 12/2013 | Tesmar | | G02B 23/04 |
| | | | | | 42/123 |
| 2015/0022884 | A1 * | 1/2015 | Hakel | | G02B 23/145 |
| | | | | | 359/422 |
| 2015/0124243 | A1 * | 5/2015 | Stockdill | | G01C 3/04 |
| | | | | | 42/122 |
| 2015/0323780 | A1 | 11/2015 | Hamilton | | |
| 2016/0356981 | A1 * | 12/2016 | Nolan | | G02B 7/021 |
| 2018/0217367 | A1 * | 8/2018 | Byler | | G02B 21/361 |
| 2018/0341082 | A1 * | 11/2018 | Minor | | F41G 1/38 |

OTHER PUBLICATIONS

International Preliminary Report on Patentability issued for International Application No. PCT/US21/13409 dated Jul. 19, 2022, 7 pages.

\* cited by examiner

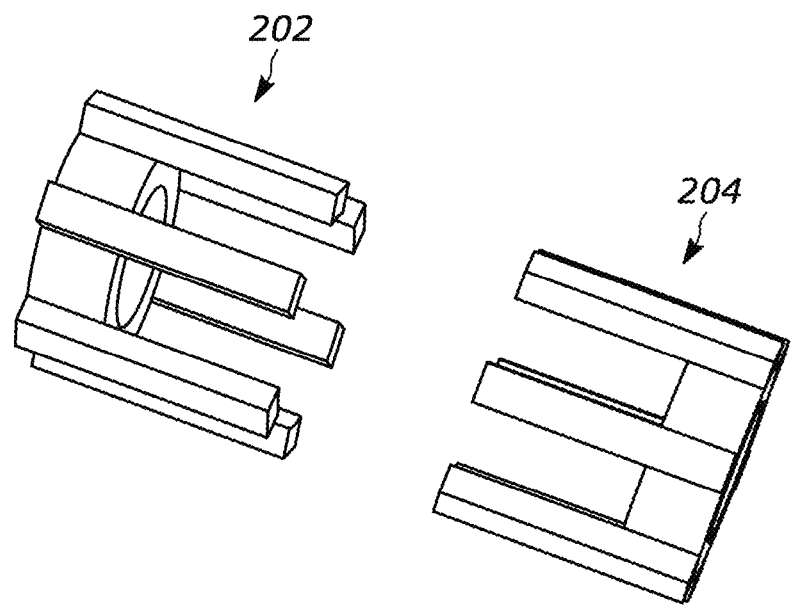
FIG. 15C
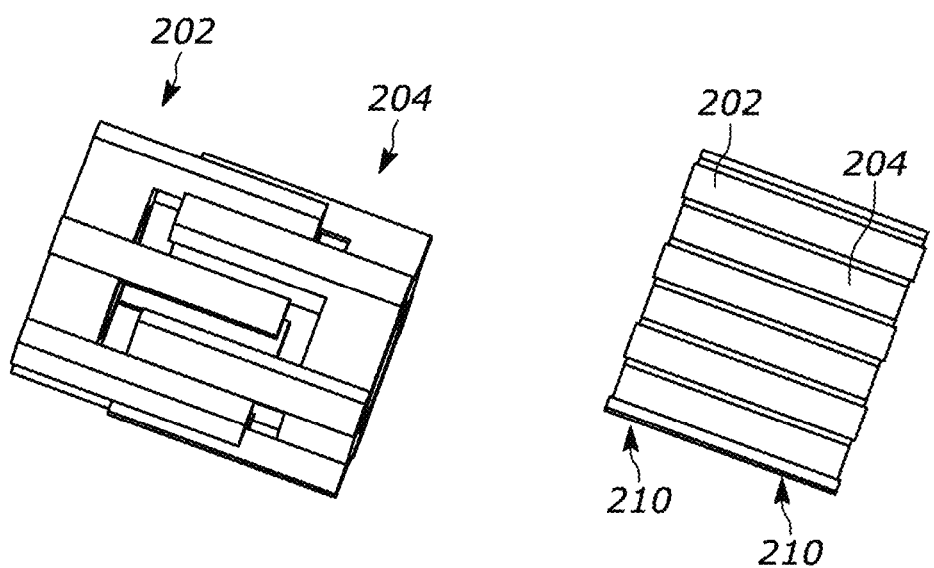
FIG. 15D
FIG. 15E

ZOOM CELL

CROSS-REFERENCE TO RELATED APPLICATIONS

This application claims priority to and is a non-provisional application of U.S. Provisional Application No. 62/961,464 filed Jan. 15, 2020, which is incorporated herein by reference in its entirety.

FIELD

The disclosure relates to viewing optics, and more particularly to viewing optics having a zoom cell assembly.

BACKGROUND

A zoom lens or zoom assembly is a lens or lens assembly in a viewing optic that changes the viewing optic's magnification or effective focal length while keeping the image plane stationary. Mechanical zoom assemblies include one or more optical elements (zoom lenses or zoom cells) which move within the assembly. Cams, gears or other devices adjust the position of the optical elements to vary the magnification.

It will be appreciated that, in order to move smoothly within its tubular housing, a cylindrical zoom lens or zoom lens assembly must have an external diameter less than that of the inner diameter of the tubular housing. As a result, zoom lens assembly can tilt within the cylindrical housing. This angular deviation creates zoom defocus for the user. In addition, this tilt can cause mechanical binding, which prevents operation of the erector system entirely Various attempts have been made at reducing the angular deviation. For example, one solution is to extend the length of the zoom lens/zoom assembly, thereby increasing the aspect ratio (width/diameter). With a larger aspect ratio, the zoom lens/zoom assembly cannot tilt as much within the cylindrical housing. However, when two zoom lenses/zoom assemblies are used, increasing the width of one or both increases the minimum distance between the lenses/assemblies. The zoom range is thereby also limited, with proper magnification, in focus, being difficult to achieve.

Attempts have also been made to specifically design zoom lenses/zoom assemblies with minimal clearances and to very specific tolerances in order to minimize the space a zoom lens has to tilt. Such designs, however, are difficult to manufacture and/or properly employ.

As outlined above, the angular deviation of zoom lenses or zoom assemblies in a viewing optic creates zoom defocus, and increasing the aspect ratio of the zoom lenses/zoom assemblies limits the zoom capabilities of a viewing optic. Thus, a need still exists for a zoom assembly which decreases or mitigates angular deviation while maintaining a full range of zoom functionality for a viewing optic.

SUMMARY

In one embodiment, the disclosure provides a zoom cell. In one embodiment, the zoom cell comprises a main zoom cell body having a central axis, at least two fingers extending from the main zoom cell body parallel to the central axis, and at least two grooves separating the at least two fingers.

In one embodiment, the zoom cell comprises a main zoom cell body having a central axis, at least two fingers extending from the main zoom cell body parallel to the central axis, and at least two grooves separating the at least two fingers, wherein at least one finger further includes a pin projecting outwardly away from the finger in a direction perpendicular to the central axis.

In one embodiment, the zoom cell comprises a main zoom cell body having a central axis, two fingers extending from the main zoom cell body parallel to the central axis, and two grooves separating the at least two fingers.

In one embodiment, the zoom cell comprises a main zoom cell body having a central axis, two fingers extending from the main zoom cell body parallel to the central axis, and two grooves separating the at least two fingers, wherein at least one finger further includes a pin projecting outwardly away from the at least one finger in a direction perpendicular to the central axis.

In one embodiment, the disclosure provides a zoom cell. In one embodiment, the zoom cell comprises a main zoom cell body having a central axis, at least two fingers extending from the main zoom cell body parallel to the central axis, and at least two grooves separating the at least two fingers, wherein the zoom cell has a width and an outer diameter, and wherein the aspect ratio as defined as the width/outer diameter is from 0.3 to 1.2.

In one embodiment, the zoom cell comprises a main zoom cell body having a central axis, at least two fingers extending from the main zoom cell body parallel to the central axis, and at least two grooves separating the at least two fingers, wherein the zoom cell has a width and an outer diameter, and wherein the aspect ratio as defined as the width/outer diameter is from 0.3 to 1.2, wherein at least one finger further includes a pin projecting outwardly away from the finger in a direction perpendicular to the central axis.

In another embodiment, the zoom cell has from two to ten fingers and from two to ten grooves. In another embodiment, the at least two fingers and at least two grooves are evenly disposed about the main zoom cell body. In another embodiment, the at least two fingers and at least two grooves are not evenly disposed about the main zoom cell body. In another embodiment, one of the at least two grooves has a greater arc length than the other of the at least two grooves. In another embodiment, the zoom cell has an aspect ratio from 0.3 to 1.2.

In another embodiment, the disclosure provides a zoom cell system. In one embodiment, the zoom cell system comprises an erector tube having an inner diameter, and at least two zoom cells positioned within the erector tube, each zoom cell having a main zoom cell body with a central axis, at least two fingers extending from the main zoom cell body parallel with the central axis and separated by at least two grooves, wherein each zoom cell has an outer diameter, as measured with reference to the outer surface of the fingers, which is the same, wherein the at least two zoom cells are positioned within the erector tube such that the at least two fingers of a first zoom cell align with a corresponding at least one of the at least two grooves of the other of the at least two zoom cells.

In another embodiment, at least one finger of each of the at least two zoom cells further includes a pin projecting outwardly away from the finger in a direction perpendicular to the central axis. In another embodiment, the erector tube further includes at least two slots, and each of the pins of the at least two zoom cells engages a respective one of the two slots. In another embodiment, the at least two fingers are evenly disposed about the main zoom cell body. In another embodiment, the at least two fingers of a first of the at least two zoom cells are not evenly disposed about the main zoom cell body. In another embodiment, the at least two grooves have different arc lengths. In another embodiment, wherein each of the at least two zoom cells have an aspect ratio from 0.3 to 1.2.

In another embodiment, the disclosure provides a viewing optic. In one embodiment, the viewing optic comprises a viewing optic body having an objective end, an eyepiece end, and a power ring for adjusting magnification; and a zoom cell system comprising an erector tube having an inner diameter, and at least two zoom cells positioned within the erector tube, each zoom cell having a main zoom cell body with a central axis, at least two fingers extending from the main zoom cell body parallel with the central axis and separated by at least two grooves, wherein each zoom cell has an outer diameter as measured with reference to the outer surface of the fingers, wherein the at least two zoom cells are positioned within the erector tube such that the at least two fingers of a first zoom cell align with a corresponding at least one of the at least two grooves of the other of the at least two zoom cells, and wherein a power ring is operatively connected to the zoom cell system.

In another embodiment, the viewing optic is a scope. In another embodiment, each of the at least two zoom cells is a zoom cell according to any of the zoom cell embodiments or combination or embodiments described herein. In another embodiment, the zoom cell system is a zoom cell system according to any embodiment or combination of embodiments described herein.

Other embodiments will be evident from a consideration of the drawings taken together with the detailed description provided herein.

BRIEF DESCRIPTION OF THE DRAWINGS

FIGS. 15A-15E show a further exemplary pair of zoom cells in accordance with embodiments of the present disclosure.

DETAILED DESCRIPTION

Figure 1:
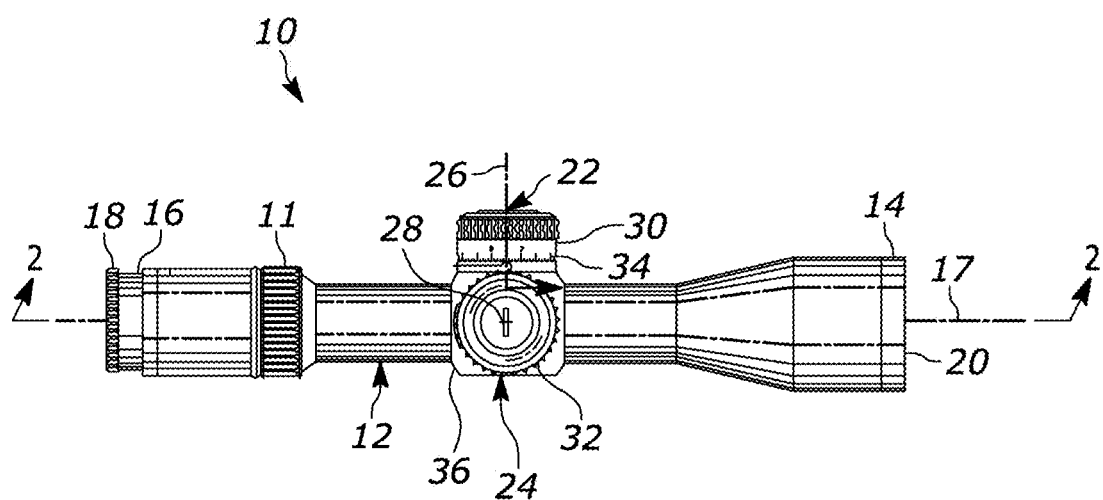
FIG. 1 is a side view of an embodiment of an exemplary viewing optic which is a rifle scope in accordance with embodiments of the present disclosure.

The apparatuses and methods disclosed herein will now be described more fully hereinafter with reference to the accompanying drawings, in which embodiments of the disclosure are shown. The apparatuses and methods disclosed herein may, however, be embodied in many different forms and should not be construed as limited to the embodiments set forth herein. Rather, these embodiments are provided so that the disclosure will be thorough and complete and will fully convey the scope of the invention to those skilled in the art.

It will be appreciated by those skilled in the art that the set of features and/or capabilities may be readily adapted within the context of a standalone viewing optic, such as a weapons sight, front-mount or rear-mount clip-on weapons sight, and other permutations of filed deployed optical weapons sights. Further, it will be appreciated by those skilled in the art that various combinations of features and capabilities may be incorporated into add-on modules for retrofitting existing fixed or variable viewing optics of any variety.

Definitions

Like numbers refer to like elements throughout. It will be understood that, although the terms first, second, etc., may be used herein to describe various elements, components, regions, and/or sections, these elements, components, regions and/or sections should not be limited by these terms. These terms are used only to distinguish one element, component, region and/or section from another element, component, region and/or section. Thus, a first element, component, region or section could be termed a second element, component, region or section without departing from the disclosure.

The numerical ranges in this disclosure are approximate, and thus may include values outside of the range unless otherwise indicated. Numerical ranges include all values from and including the lower and the upper values (unless specifically stated otherwise), in increments of one unit, provided that there is a separation of at least two units between any lower value and any higher value. As an example, if a compositional, physical or other property, such as, for example, distance, speed, velocity, etc., is from 10 to 100, it is intended that all individual values, such as 10, 11, 12, etc., and sub ranges, such as 10 to 44, 55 to 70, 97 to 100, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, distances from a user of a device to a target.

Spatial terms, such as "beneath," "below," "lower," "above," "upper," and the like, may be used herein for ease of description to describe one element's or feature's relationship to another element(s) or feature(s) as illustrated in the figures. It will be understood that the spatially relative terms are intended to encompass different orientations of device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the term "and/or" includes any and all combinations of one or more of the associated listed items. For example, when used in a phrase such as "A and/or B," the phrase "and/or" is intended to include both A and B; A or B; A (alone); and B (alone). Likewise, the term "and/or" as used in a phrase such as "A, B and/or C" is intended to encompass each of the following embodiments" A, B and C; A, B, or C; A or C; A or B; B or C; A and C; A and B; B and C; A (alone); B (alone); and C (alone).

It will be understood that when an element or layer is referred to as being "on," "connected to" or "coupled to" another element or layer, it can be directly on, connected or coupled to the other element or layer. Alternatively, intervening elements or layers may be present. In contrast, when an element or layer is referred to as being "directly on," "directly connected to" or "directly coupled to" another element or layer, there are no intervening elements or layers present.

As used herein, "bearing surface" is the area of contact between two objects.

As used herein, "erector sleeve" is a protrusion from the erector lens mount which engages a slot in the erector tube and/or cam tube which serves an analogous purpose. This could be integral to the mount or detachable.

As used herein, the term "erector tube" is any structure or device having an opening to receive an erector lens mount.

As used herein, the terms "user" and "shooter" interchangeably refer to either the operator making the shot or an individual observing the shot in collaboration with the operator making the shot.

As used herein, the term "viewing optic" refers to an apparatus or assembly used by a user, a shooter or a spotter to select, identify and/or monitor a target. A viewing optic may rely on visual observation of the target or, for example, on infrared (IR), ultraviolet (UV), radar, thermal, microwave, magnetic imaging, radiation including X-ray, gamma ray, isotope and particle radiation, night vision, vibrational receptors including ultra-sound, sound pulse, sonar, seismic vibrations, magnetic resonance, gravitational receptors, broadcast frequencies including radio wave, television and cellular receptors, or other image of the target. The image of the target presented to a user/shooter/spotter by a viewing optic may be unaltered, or it may be enhanced, for example, by magnification, amplification, subtraction, superimposition, filtration, stabilization, template matching, or other means. The target selected, identified and/or monitored by a viewing optic may be within the line of sight of the shooter or tangential to the sight of the shooter. In other embodiments, the shooter's line of sight may be obstructed while the viewing optic presents a focused image of the target. The image of the target acquired by the viewing optic may, for example, be analog or digital, and shared, stored archived or transmitted within a network of one or more shooters and spotters by, for example, video, physical cable or wire, IR, radio wave, cellular connections, laser pulse, optical 802.11b or other wireless transmission using, for example, protocols such as html. SML, SOAP, X.25, SNA, etc., Bluetooth™, Serial, USB or other suitable image distribution method. The term "viewing optic" is used interchangeably with "optic sight."

As used herein, a "firearm" is a portable gun, being a barreled weapon that launches one or more projectiles often driven by the action of an explosive force. As used herein, the term "firearm" includes a handgun, a long gun, a rifle, shotgun, a carbine, automatic weapons, semi-automatic weapons, a machine gun, a sub-machine gun, an automatic rifle and an assault rifle.

As used herein, the term "outward scene" refers to a real world scene, including but not limited to a target.

As used herein, the term "zeroing" refers to aligning the point of aim (what the shooter is aiming at) and the point of impact (where the bullet fired from the firearm is actually hitting) at a specific distance. In one embodiment, zeroing is the process of adjusting a rifle scope or other viewing optic to a setting in which accurate allowance has been made for both windage and elevation for a specified range.

Figure 2:
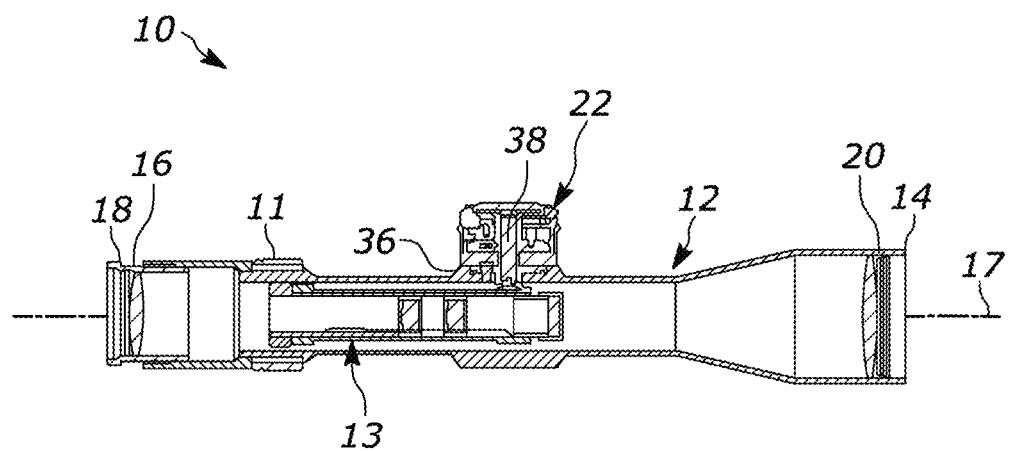
FIG. 2 is a cross-sectional view of the viewing optic of FIG. 1 taken along line 2-2 in accordance with embodiments of the present disclosure.

FIGS. 1 and 2 illustrate an exemplary viewing optic 10 which is a rifle scope. The viewing optic 10 has a body or housing 12 that encloses a movable optical element 13 which is an erector tube. The scope body 12 is an elongate tube having a larger opening at its front 14 and a smaller opening at its rear 16. An eyepiece 18 is attached to the rear of the scope body 12, and an objective lens 20 is attached to the front of the scope body 12. The center axis of the movable optical element 13 defines the optical axis 17 of the optical device 10.

In the embodiments shown, an elevation turret 22 and a windage turret 24 are two knobs in the outside center part of the scope body 12. They are marked in increments by indicia 34 on their perimeters 30 and 32 and are used to adjust the elevation and windage of the movable optical element 13 for points of impact change. These knobs 22, 24 protrude from the turret housing 36. The turrets 22, 24 are arranged so that the elevation turret rotation axis 26 is perpendicular to the windage turret rotation axis 28. Indicia 34 typically include tick marks, each corresponding to a click, and larger tick marks at selected intervals, as well as numerals indicating angle of adjustment or distance for bullet drop compensation.

The movable optical element 13 is adjusted by rotating the turrets one or more clicks. A click is one tactile adjustment increment on the windage or elevation turret of the viewing optic 10, each of which corresponds to one of the indicia 34. For example, as in the current embodiment, one click changes the viewing optic's point of impact by 0.1 milliradians (mrad). However, in further embodiments, the turrets can be used with other units and measures of increments, including, for example, minutes of angle (MOA) increments.

A power ring 11 is located at the eyepiece-end of the viewing optic 10. Rotation of the power ring 11 adjusts the magnification by changing the position of one or more zoom cells 100 within the movable optical element 13. In the embodiment shown, the power ring 11 allows for continuous magnification adjustment within the range permitted by the viewing optic 10. That is, in the embodiment shown, the power ring 11 does not have clicks or defined positions during rotation. In further embodiments, the magnification does adjust by rotating the power ring 11 one or more clicks or tactile adjustment increment. For example, in an embodiment, one click changes the magnification by 1×. In the embodiment shown, the power ring 11 does not contain indicia. In further embodiments, the power ring 11 does contain indicia, each of which corresponds to a click or tactile adjustment increment.

Figure 3A:
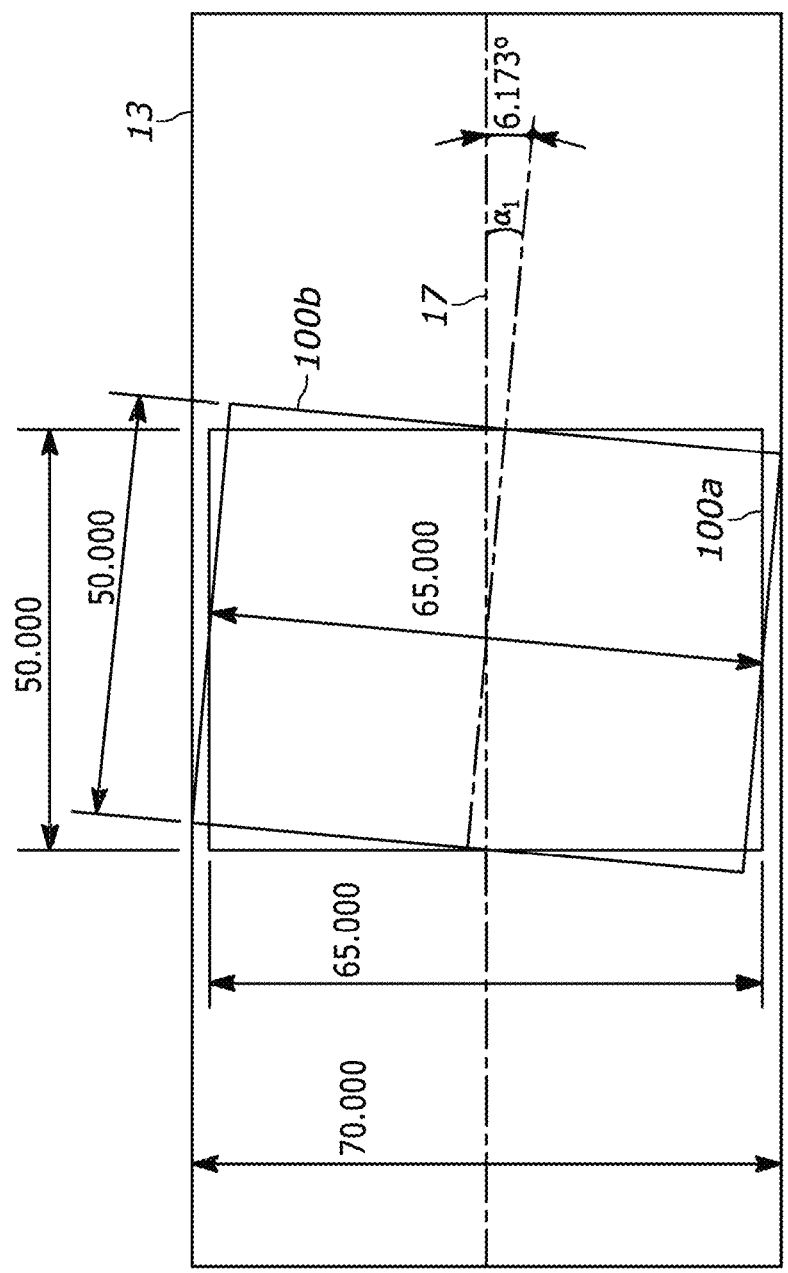
FIG. 3A is schematic showing the nominal position and maximum angular deviation of a representative zoom cell of a common design.
Figure 3B:
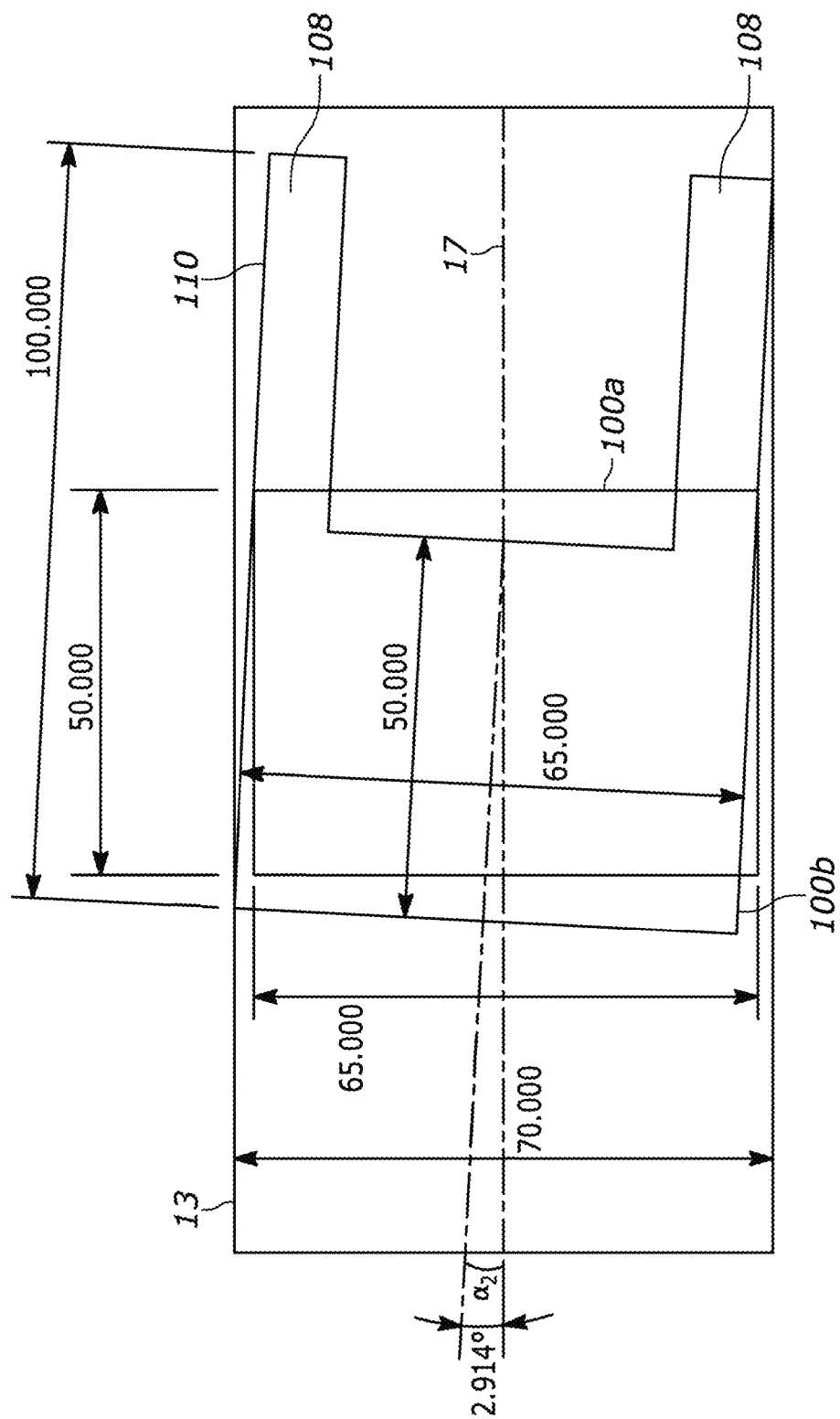
FIG. 3B is a schematic showing the nominal position and maximum angular deviation of a further representative zoom cell of a common design.

FIGS. 3A and 3B are schematics showing representative zoom cells of common (existing) design. In the embodiments shown, the erector tube 13 is shown as a rectangle in which a zoom cell 100a, 100b is positioned. It will be appreciated that the zoom cells 100a, 100b are generally cylindrical and the schematics 3A and 3B have been simplified for illustrative purposes. In both FIGS. 3A and 3B, the zoom cell 100a represents a common zoom cell in its nominal position in which the optical axis 17 is the same as the center axis 17 of the zoom cell 100a. However, because the outer diameter of the zoom cells 100a, 100b is less than the inner diameter of the erector tube 13, the zoom cells can tilt within the erector tube as shown with reference to zoom cells 100b, causing angular deviation from the optical axis 17.

In the common zoom lens system of FIG. 3A, the bearing surface 110, or outer surface of the zoom cells 100a, 100b which is intended to slide within the erector tube 13, is short. That is, the zoom cells 100a, 100b have a small length resulting in a low aspect ratio (width/diameter). The angular deviation $\alpha_1$ of the zoom cell 100b shown in FIG. 3A is therefore greater than the angular deviation $\alpha_2$ of the zoom cell 100b shown in FIG. 3B which includes a number of "fingers" 108 which increase the aspect ratio of the zoom cell 100b. By doubling the length of the bearing surface 110 of the zoom cell 100b as shown in FIG. 3B relative to the zoom cell 100b of FIG. 1, the angular deviation is decreased by over half.

Figure 4A:
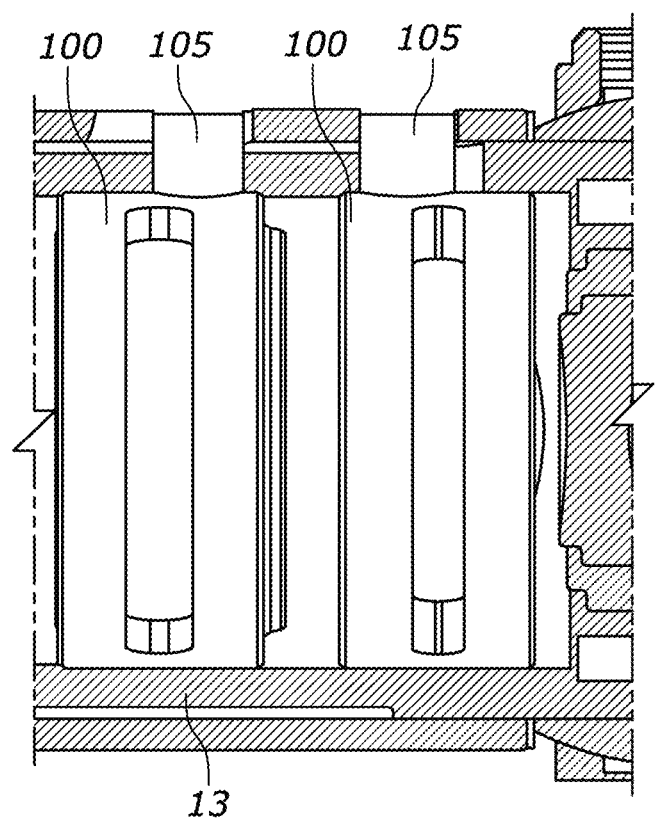
FIG. 4A is a side perspective view of a pair of zoom cells of common design.
Figure 4B:
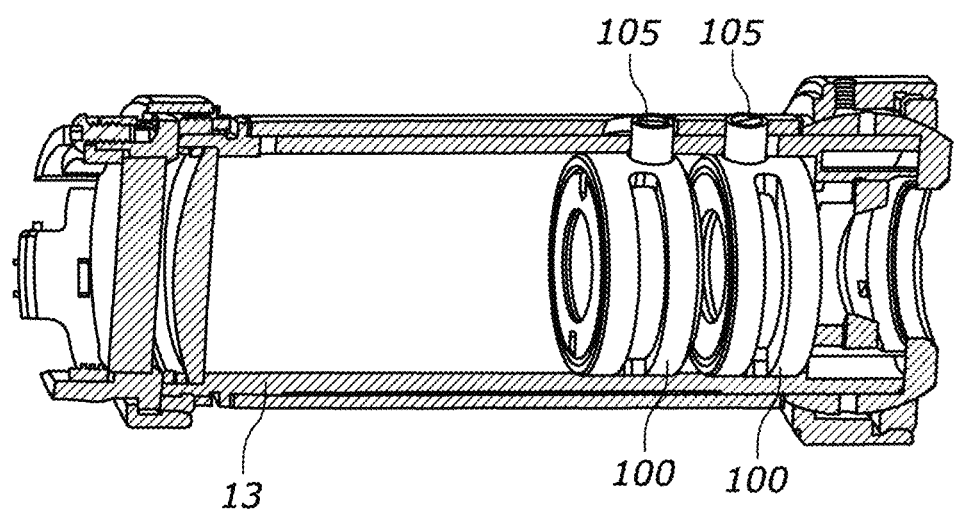
FIG. 4B is a side view of the pair of zoom cells of common design of FIG. 4A.

FIGS. 4A and 4B illustrate further representative zoom cells of common (existing) design. As shown in FIGS. 4A and 4B, the angular deviation of the zoom cells 100 is controlled by physically limiting the space in which the zoom cells 100 can tilt. In particular, rotation of the zoom cells 100 about the optical axis is prevented or reduced using a pin/slot mechanism 105, and angular deviation is mitigated by the minimal clearance between the bearing surfaces 110 of the zoom cells 100 and the inner surface of the erector tube 13. However, it will be appreciated that the manufacturing of components with such minimal clearances and tolerances is in many instances difficult, costly and/or impractical. In some instances, to be within the tolerances prescribed by a given optical design is not manufacturable due to high fallout rates and/or unachievable tolerances.

Figure 5:
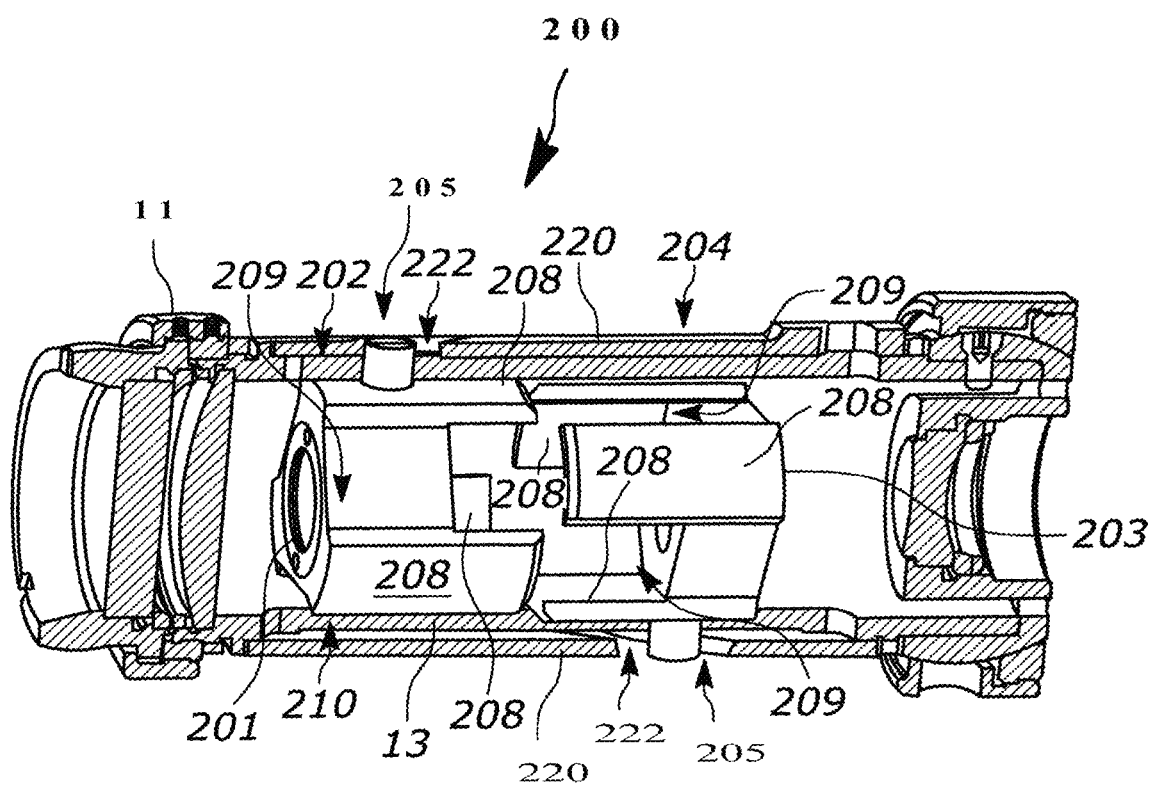
FIG. 5 is a side perspective view of a pair of zoom cells in accordance with embodiments of the present disclosure.
Figure 6:
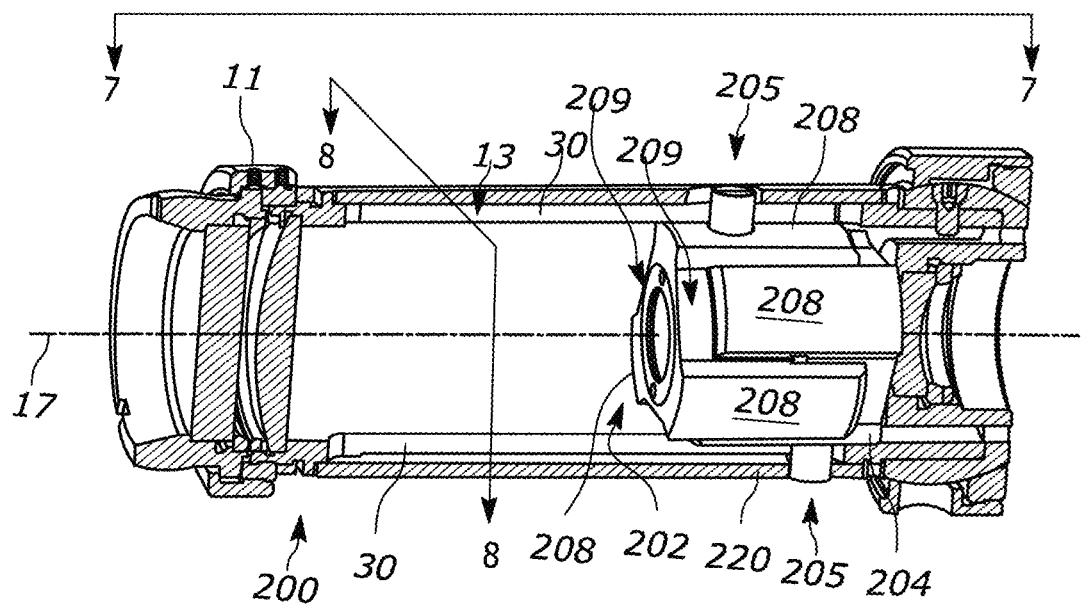
FIG. 6 is a side perspective view of the pair of zoom cells of FIG. 5 positioned within an erector tube nearer the eyepiece end, in accordance with embodiments of the present disclosure.
Figure 7:
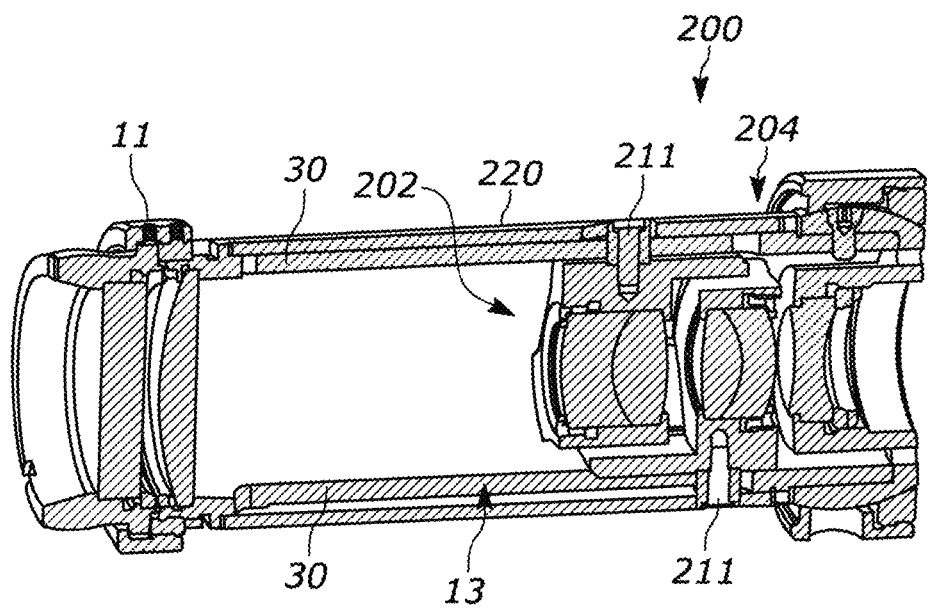
FIG. 7 is a cross-sectional view FIG. 6 taken along line 7-7 in accordance with embodiments of the present disclosure.

FIG. 5 is a side perspective view of a pair of zoom cells 202, 204 of a zoom cell system 200 in accordance with embodiments of the present disclosure. In the embodiment shown, the zoom cells 202, 204 each have an interrupted bearing surface 210 which creates, in essence, a number of fingers 208 separated by the same number of grooves 209. The fingers 208 extend away from the main zoom cell bodies 201, 203, each in the same direction, parallel with the optical axis 17.

As shown in FIG. 5, the zoom cells 202, 204 are positioned within the erector tube 13 such that the fingers 208 of each of the zoom cells 202, 204 extend towards one another. Further, the zoom cells 202, 204 are rotationally offset from one another such that the fingers 208 of one of the zoom cells 202, 204 align with the grooves 209 of the other of the zoom cells 202, 204, and vice versa. As such, the zoom cells 202, 204 both have a large aspect ratio of 0.2 to 1.7 and are able to translate along the required functional range of the erector tube 13 by nesting with one another as shown in FIGS. 6-11.

In an embodiment, the aspect ratio is at least 0.2. In another embodiment, the aspect ratio is at least 0.3. In one embodiment, the aspect ratio is less than 1.7. In another embodiment, the aspect ratio is less than 1.5. In still another embodiment, the aspect ratio is less than 1.2.

In one embodiment, the aspect ratio is from 0.2 to 1.4 or from 0.2 to 1.3 or from 0.2 to 1.2.

In one embodiment, the aspect ratio is from 0.3 to 1.4 or from 0.4 to 1.4 or from 0.5 to 1.4.

In one embodiment, the aspect ratio is from 0.3 to 1.2. In one embodiment, the aspect ratio is from 0.3 to 1.1, or from 0.3 to 1.0, or from 0.3 to 0.9, or from 0.3 to 0.8, or from 0.3 to 0.7, or or from 0.3 to 0.6, or from 0.3 to 0.5, or from 0.3 to 0.4.

In one embodiment, the aspect ratio is from 0.4 to 1.2 or from 0.5 to 1.2 or from 0.6 to 1.2, or from 0.7 to 1.2, or from 0.8 to 1.2, or from 0.9 to 1.2, or from 1.0 to 1.2, or from 1.1 to 1.2.

Despite the ability to nest with one another, zoom cells 202, 204 have the same external diameter as measured with reference from the outer surface of the fingers 208 (i.e., the bearing surface 210). The outer diameter of each of zoom cells 202, 204 is specifically calculated to be slightly less than the inner diameter of the erector tube 13 to further limit angular deviation but also not hinder movement of the zoom cells 202, 204 within the erector tube 13.

Also shown in FIGS. 5-11 are the pin/slot mechanisms 205 that prevent the zoom cells 202, 204 from rotating about the optical axis 17 within the erector tube 13. Each zoom cell 202, 204 has a pin 211 protruding from its bearing surface 210. In the embodiment shown, the pins 211 protrude from the surface of one of the fingers 208. The erector tube 13 contains two slots 30, each corresponding to one of the pins 211 of the zoom cells 202, 204. The erector tube housing 220 likewise includes two slots 222, though the slots 222 of the erector tube housing 220 spiral around the optical axis 17 along the length of the erector tube housing 220. When the power ring 11 is rotated to adjust magnification, the zoom cells 202, 204 move not only in coordination in a translating fashion within the erector tube 13, but also in coordination rotationally by virtue of the pins 211 engaging the spiral slots 222.

Figure 8:
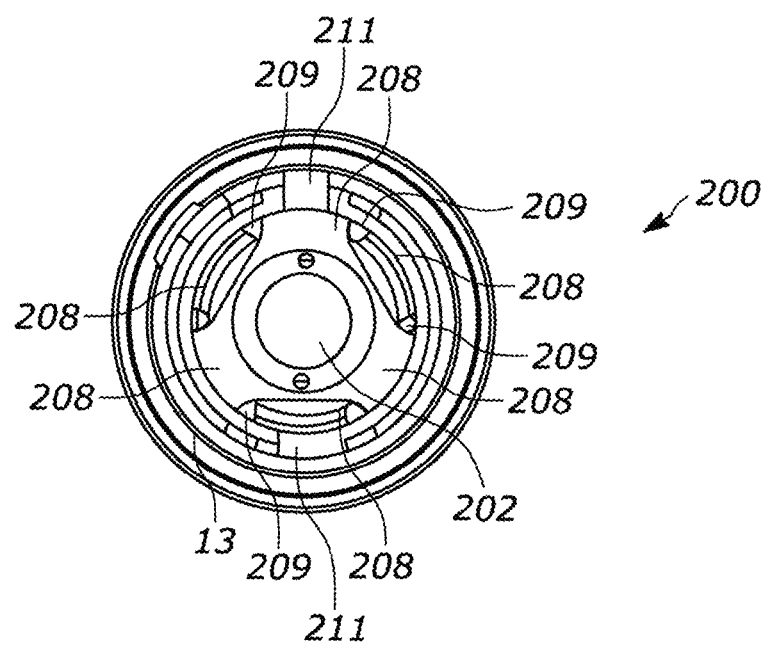
FIG. 8 is a cross-sectional view of FIG. 6 taken along line 8-8 in accordance with embodiments of the present disclosure.
Figure 9:
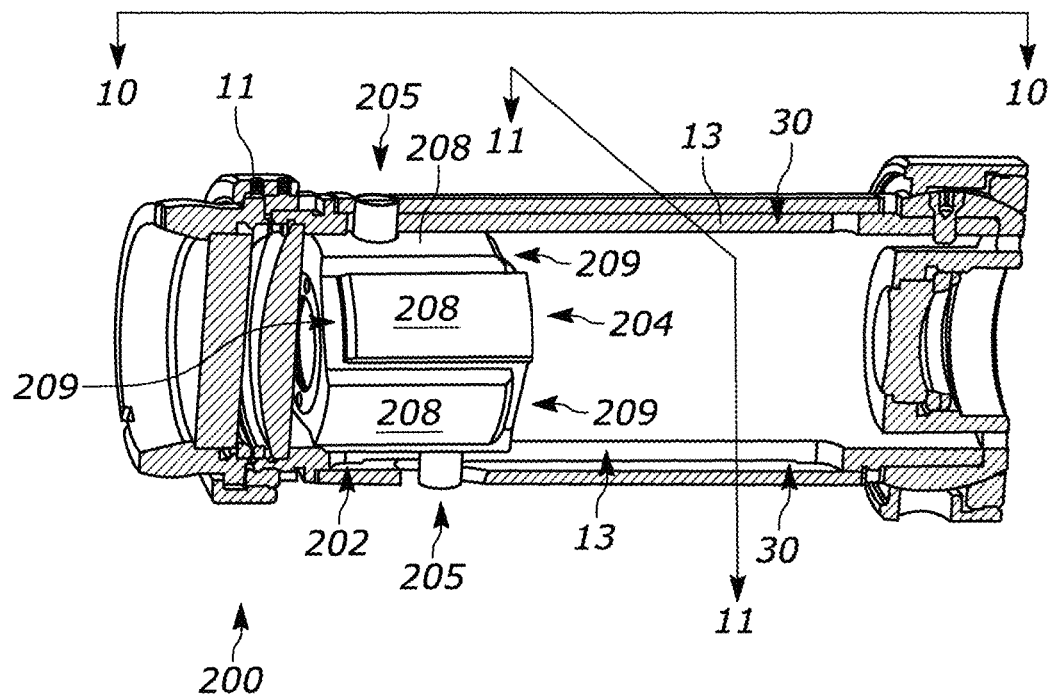
FIG. 9 is a side perspective view of the pair of zoom cells of FIG. 5 positioned within an erector tube nearer the objective lens end, in accordance with embodiments of the present disclosure.
Figure 10:
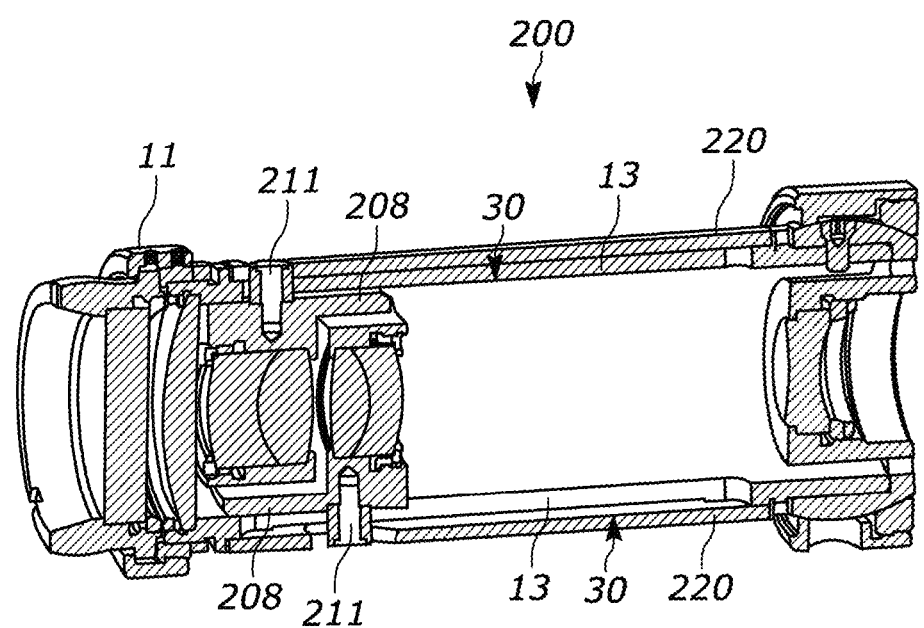
FIG. 10 is a cross-sectional view of FIG. 9 taken along line 10-10 in accordance with embodiments of the present disclosure.
Figure 11:
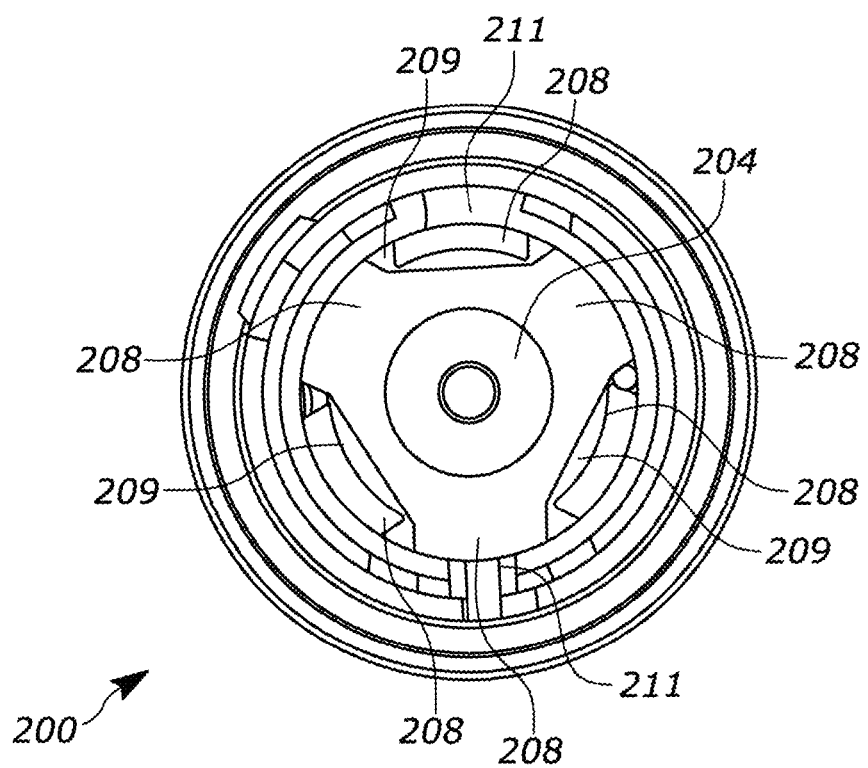
FIG. 11 is a cross-sectional view of FIG. 9 taken along line 11-11 in accordance with embodiments of the present disclosure.

With reference to FIGS. 8 and 11 in particularly, it will be noted that the grooves (or channels) 209, a respective one of the zoom cells 202, 204, has an arc length greater than that of the fingers 208 of the corresponding one of the zoom cells 202, 204. In that way, the fingers 208 of each zoom cell 202, 204 can nest freely inside the grooves 209 of the other zoom cell 202, 204, and the rotational constraints of the zoom cells 202, 204, provided by the pin/slot mechanisms 205 discussed above, prevent the fingers 208 and grooves 209 of the corresponding finger 208/groove 209 pairs from contacting one another.

Figure 12A:
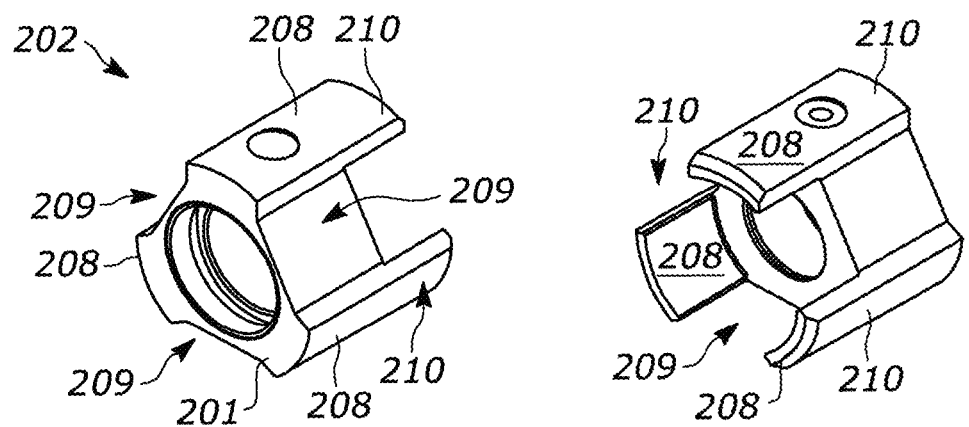
FIGS. 12A and 12B show an exemplary first zoom cell in accordance with embodiments of the present disclosure.
Figure 12B:
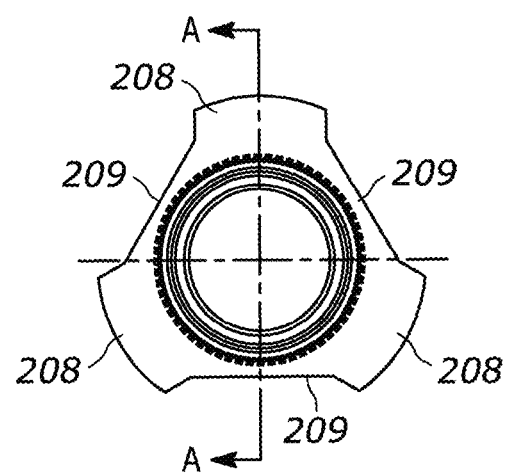
Figure 13A:
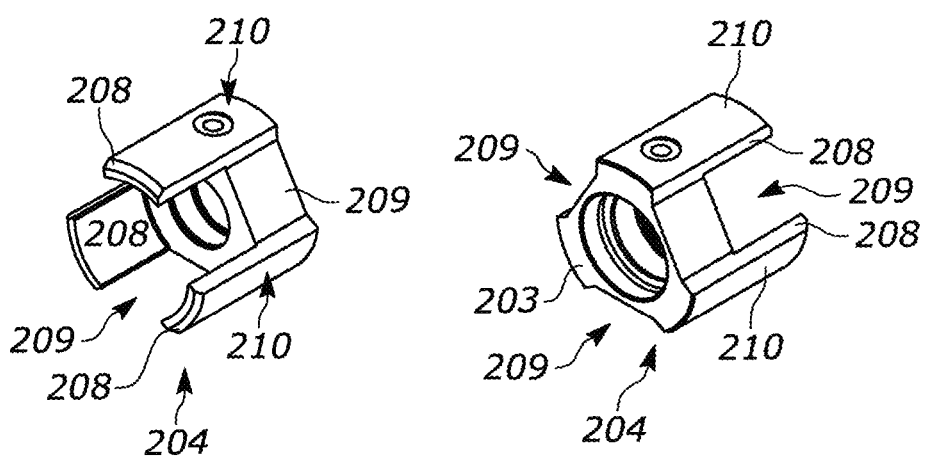
FIG. 13A shows an exemplary second zoom cell in accordance with embodiments of the present disclosure.

FIGS. 12A, 12B and 13 show the zoom cells 202, 204, respectively, in more detail. In the particular embodiments shown, the zoom cells 202, 204 each have three fingers 208 and three grooves 209, and the fingers 208 and grooves 209 are evenly disposed about the main zoom cell bodies 201, 203. The fingers 208 extend outward from the main zoom cell bodies 201, 203, respectively, and each in the same direction perpendicular to the circumference. In further embodiments, the zoom cells 202, 204 may have differing numbers of fingers and grooves, including, for example, from 2, or 3, or 4, or 5, or 6 to 7, or 8, or 9, or 10 fingers and from 2, or 3, or 4, or 5, or 6 to 7, or 8, or 9, or 10 grooves. Moreover, a zoom cell 202, 204 may have an even number of fingers and grooves, or an odd number of fingers and grooves. For example, in the embodiment shown in FIGS. 14A-14E, one of the zoom cells 202 includes four fingers 208 and four grooves 209, and the other of the zoom cells 204 includes three fingers 208 and three grooves 209. Similarly, in the embodiment shown in FIGS. 15A-15E, one of the zoom cells 202 includes six fingers 208 and six grooves 209, and the other of the zoom cells 204 includes five fingers 208 and five grooves 209. In such embodiments in which the number of fingers 208 on a given zoom cell differs from the number of grooves 209 on the other of the zoom cells, it will be appreciated that a single groove 209 may then correspond to two or more fingers 208 on its corresponding zoom cell, as shown, for example, in FIGS. 14D-14E and 15D-15E.

In a preferred embodiment, each zoom cell 202, 204 includes more than one finger and more than one groove.

Figure 14A:
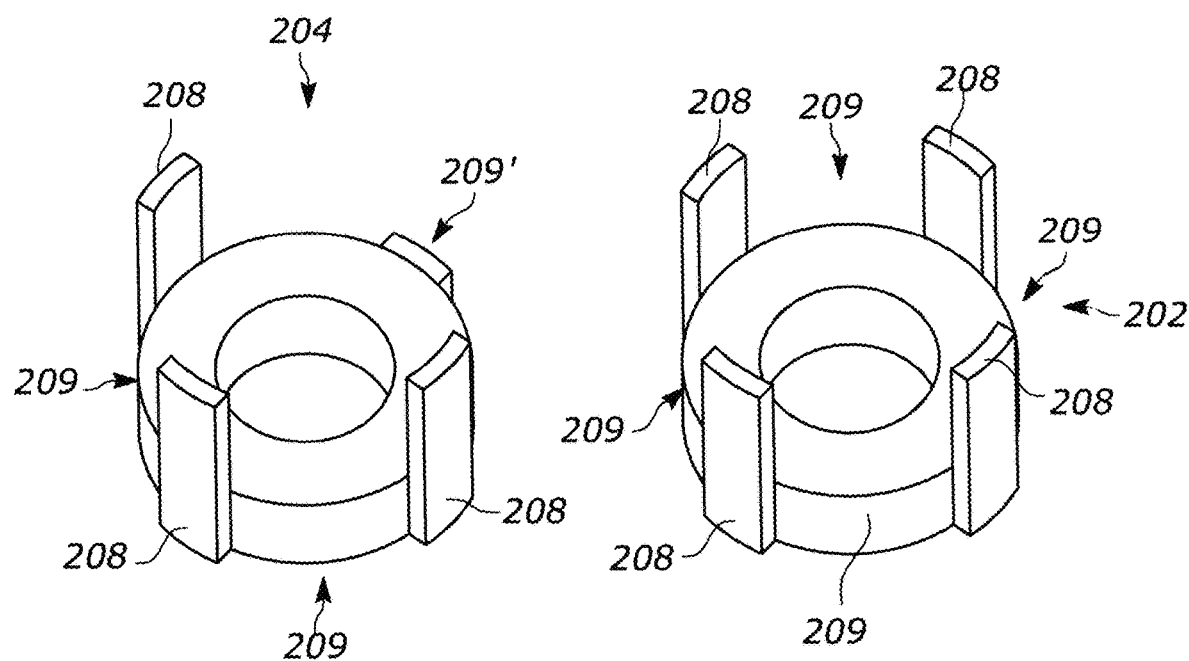
FIGS. 14A-14E show a further exemplary pair of zoom cells in accordance with embodiments of the present disclosure.
Figure 14B:
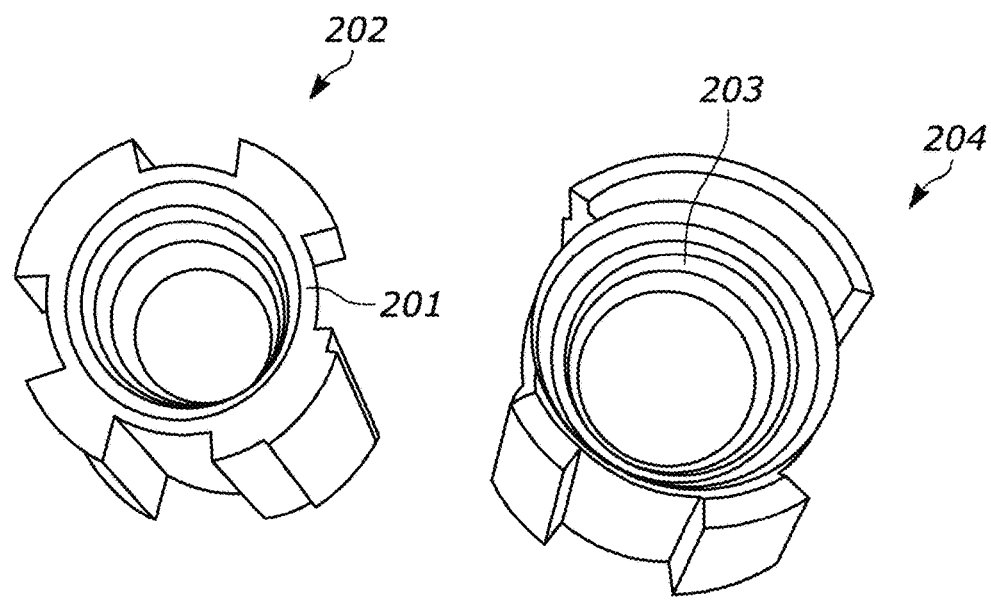
Figure 14C:
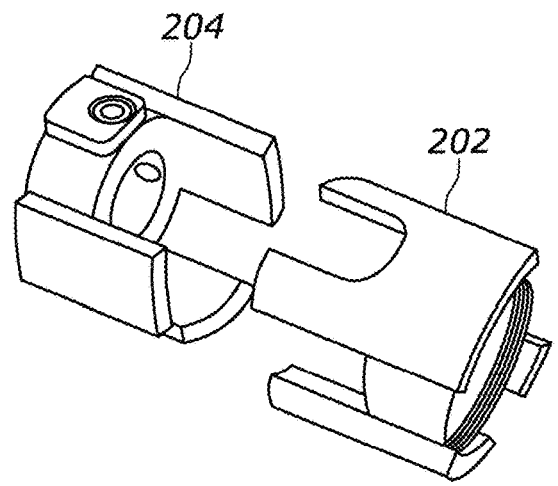
Figure 14D:
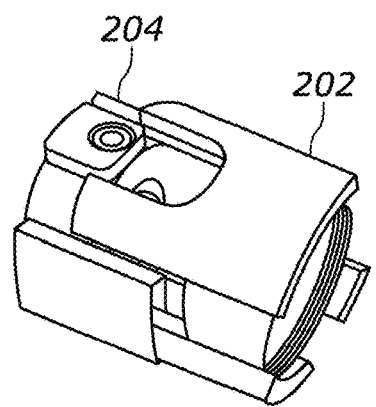
Figure 14E:
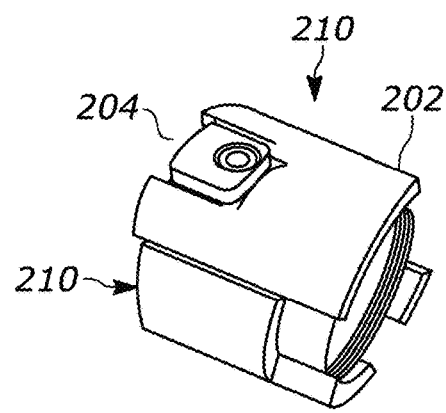
Figure 15A:
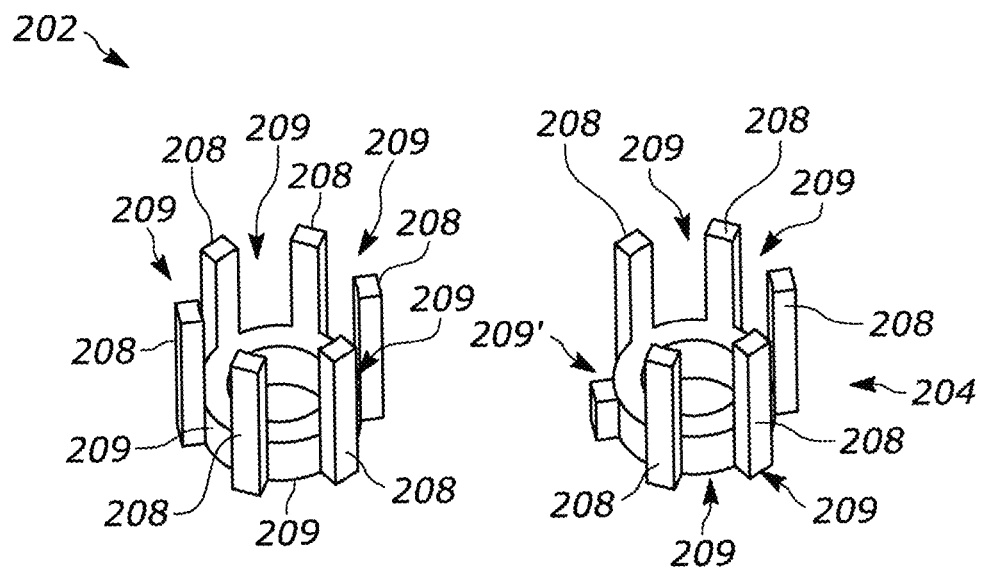
Figure 15B:
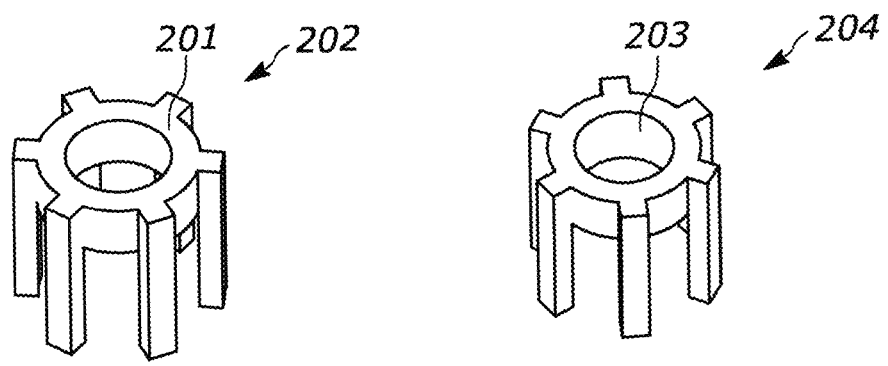

In still further embodiments, the fingers 208 and/or grooves 209 may not be evenly disposed about the main zoom cell bodies 201, 203, such as, for example, again shown in FIGS. 14A-15E. Specifically, in the embodiments shown in FIGS. 14A-15E, the zoom cell 204 has fingers 208 that are not evenly distributed about the main zoom cell body 203. In embodiments in which the fingers 208 are not evenly distributed about a main zoom cell body, one or more of the grooves 209 will have an arc length different than that of the other grooves. For example, as shown in FIG. 14A, zoom cell 204 has three fingers 208 that are not evenly distributed around the main zoom cell body 203 but otherwise evenly spaced within approximately ¾ of the circumference of the main zoom cell body 203. As a result, one of the grooves 209' has a greater arc length than the other grooves 209. Similarly, zoom cell 204 of FIG. 15A has fingers 208 that are not evenly distributed around the main zoom cell body 203 but are otherwise evenly spaced within approximately ¾ of the circumference of the main zoom cell body 203. As a result, groove 209' has a greater arc length than the other grooves 209.

In each of the embodiments shown in FIGS. 5-15E, each zoom cell 202, 204 has a cumulative bearing surface 210 (i.e., the outer surface of the fingers 208) which is greater than 180° about the primary axis (i.e., optical axis 17) but less than 360°. In further embodiments, the zoom cells 202, 204 have a cumulative bearing surface 210 less than 180° per zoom cell. Both zoom cells meshed together plus the clearance space between the fingers and grooves will equal the 360 degrees. The cumulative bearing surface needs to be distributed around the central axis such that they axis of the erector tube and zoom cell remine colinear.

In further embodiments, the zoom cells 202, 204 have a cumulative bearing surface 210 from greater than 180°, or 185°, or 190°, or 195°, or 200° to 205°, or 210°, or 215°, or 220°, or 225°, or 230°, or 240°, or 250°, or 300°, or less than 360°.

In accordance with embodiments of the present disclosure, zoom cells 202, 204 are manufactured starting with a solid, cylindrical tube of a desired length (or width, as the dimension is referred to in the final product). The cylindrical tube may have a hollow central bore or a hollow central bore may be machined into the cylinder. The grooves (and fingers) are created through a milling process (removing material). However, in further embodiments, the fingers may be added to a base structure or the entire structure may be manufactured using an additive process such as 3D-printing.

In the embodiments shown, the zoom cells 202, 204 are made of metal; however, other materials having sufficient strength, durability and integrity for the intended purpose are also contemplated.

Figure 16A:
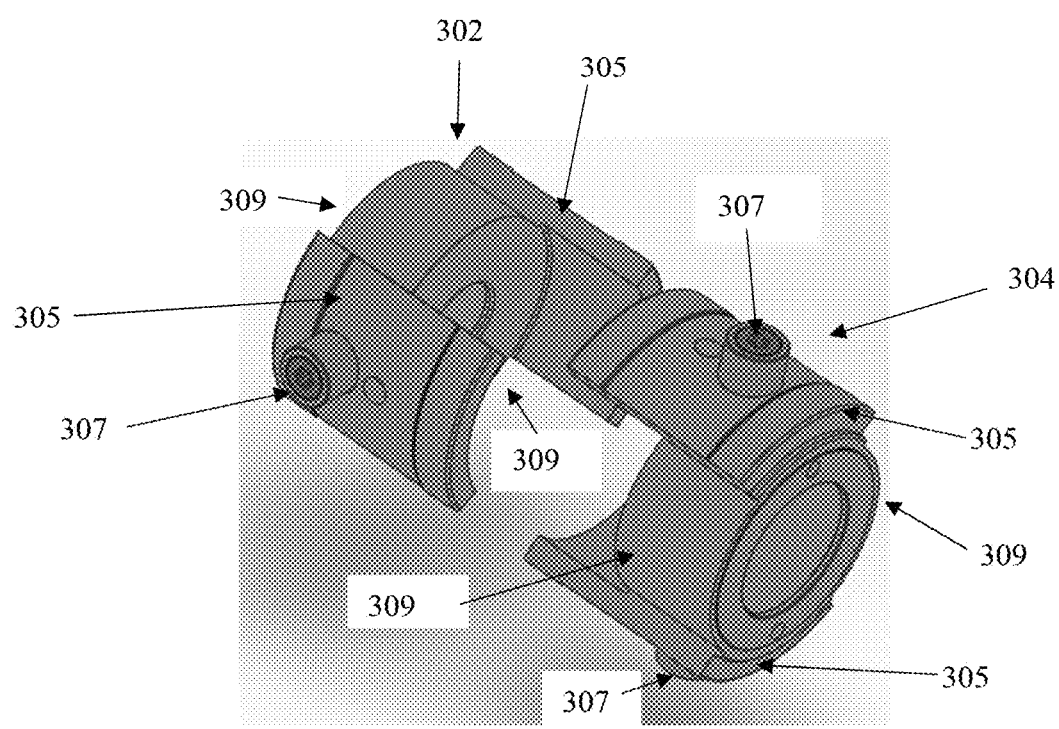
FIGS. 16A and 16B show a further exemplary pair of zoom cells in accordance with embodiments of the present disclosure.
Figure 16B:
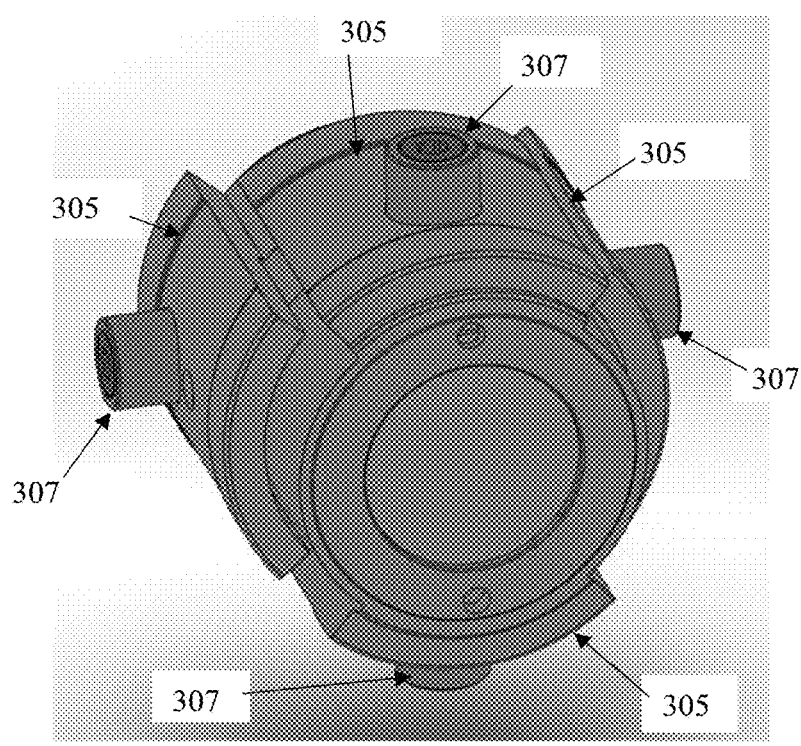

In one representative embodiment, each zoom cell can have two fingers and two grooves. FIGS. 16A and 16B show the zoom cells 302, 304, respectively, in more detail. In the particular embodiments shown, the zoom cells 302, 304 each have two fingers, 305, and two grooves 309, and the fingers 305 and grooves 309 can be evenly disposed about the main zoom cell bodies. The fingers 305 extend outward from the main zoom cell bodies, respectively, and each in the same direction perpendicular to the circumference.

Also shown in FIGS. 16A and 16B are the pin mechanisms, 307, which prevent the zoom cells 302, 304 from rotating about the optical axis within the erector tube. Each zoom cell 302, 304 has two pins 307, protruding from its bearing surface. In the embodiment shown, the pins 307 protrude from the surface of each finger 305 of each zoom cell, 302, 304. In this embodiment, the erector tube contains four slots, each corresponding to one of the pins 307 of the zoom cells 302, 304. The erector tube housing likewise includes four slots, though the slots of the erector tube housing spiral around the optical axis along the length of the erector tube housing. When the power ring is rotated to adjust magnification, the zoom cells 302, 304 move not only in coordination in a translating fashion within the erector tube, but also in coordination rotationally by virtue of the pins 307 engaging the spiral slots.

Figure 17A:
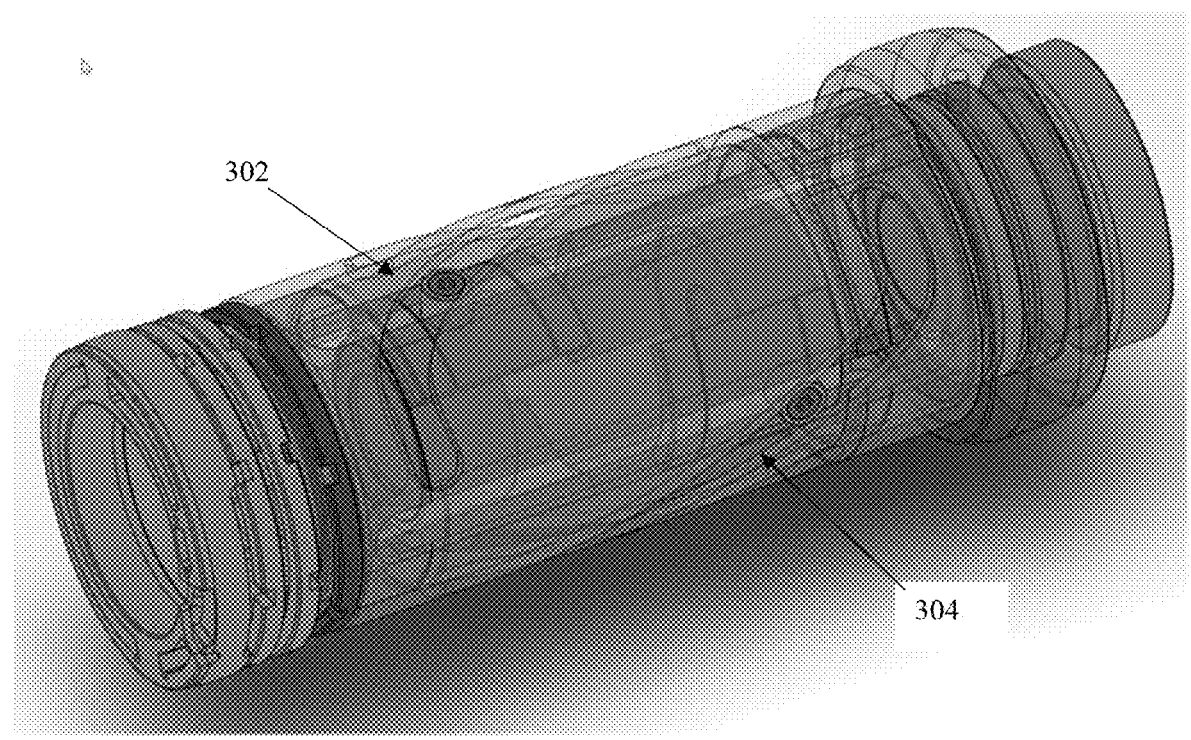
FIGS. 17A and 17B are a view of the pair of zoom cells of FIG. 16A positioned within an erector tube nearer the eyepiece end, in accordance with embodiments of the present disclosure.
Figure 17B:
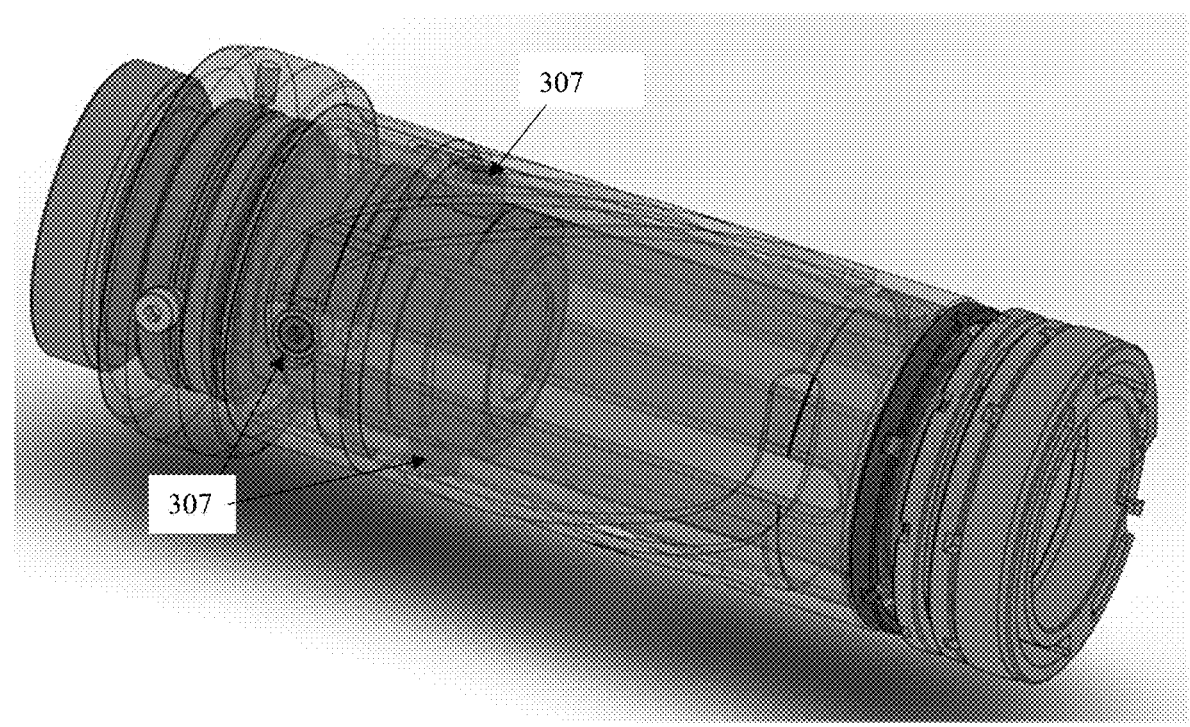

FIGS. 17A and 17B are views of a pair of zoom cells 302, 304 of a zoom cell system in accordance with embodiments of the present disclosure. In the embodiment shown, the zoom cells 302, 304 each have an interrupted bearing surface that creates two fingers separated by two grooves as shown in FIGS. 16A and 16B. The fingers extend away from the main zoom cell bodies, each in the same direction, parallel with the optical axis.

As shown in FIGS. 17A and 17B, the zoom cells 302, 304 are positioned within the erector tube such that the fingers of each of the zoom cells 302, 304 extend towards one another. Further, the zoom cells 302, 304 are rotationally offset from one another such that the fingers of one of the zoom cells 302, 304 align with the grooves of the other of the zoom cells 302, 304, and vice versa. Each zoom cell, 302, 304 has two pins 307, with a pin 307 projecting outwardly away from each finger in a direction perpendicular to the central axis.

In one embodiment, a zoom cell has at least two pins. In one embodiment, a zoom cell has 1, 2, 3, 4, 5, or greater than 5 pins. In one embodiment, each zoom cell of a zoom cell system may have an equal number of pins. In another embodiment, one zoom cell of a zoom cell system may have a greater number of pins as compared to another zoom cell of the zoom cell system. In another embodiment, one zoom cell of a zoom cell system may have a lesser number of pins as compared to another zoom cell of the zoom cell system.

In yet another embodiment, each finger of each zoom cell has at least one pin. In another embodiment, each finger of each zoom cell has at least two pins. In one embodiment, each finger of a zoom cell may have an equal number of pins. In another embodiment, one finger of a zoom cell may have a different number of pins as compared to a different finger of the same zoom cell. In one embodiment, a finger of a zoom cell may have a greater number of pins as compared to a different finger of the same zoom cell. In another embodiment, a finger of a zoom cell may have a lesser number of pins as compared to a different finger of the same zoom cell.

In one embodiment, the zoom cells of a zoom cell system may have an equal number of pins. In another embodiment, the zoom cells of a zoom cell system may have a different number of pins. In one embodiment, one zoom cell of a zoom cell system may have a greater number of pins as compared to a different zoom cell of the same zoom cell system. In one embodiment, one zoom cell of a zoom cell system may have a lesser number of pins as compared to a different zoom cell of the same zoom cell system.

In one embodiment, pin axes are 90° offset. In one embodiment, pin axes are 45° offset. In another embodiment, pin axes are 180° offset. In another embodiment, pin axes are 270° offset.

In one embodiment, the erector tube has an equivalent number of slots to the total number of pins of the zoom cells. In one embodiment, the erector tube housing has an equivalent number of slots to the total number of pins of the zoom cells.

In one embodiment, the erector tube has an equivalent number of slots to the total number of pins of the zoom cell system. In one embodiment, the erector tube housing has an equivalent number of slots to the total number of pins of the zoom cell system.

Various modifications and variations of the described structures, assemblies, apparatuses and methods of the invention will be apparent to those skilled in the art without departing from the scope and spirit of the invention. One skilled in the art will recognize at once that it would be possible to construct the present invention from a variety of materials and in a variety of different ways. Although the invention has been described in connection with specific preferred embodiments, it should be understood that the invention should not be unduly limited to such specific embodiments. While the preferred embodiments have been described in detail, and shown in the accompanying drawings, it will be evident that various further modifications are possible without departing from the scope of the invention as set forth in the appended claims. Indeed, various modifications of the described modes for carrying out the invention which are obvious to those skilled in marksmanship or related fields are intended to be within the scope of the following claims.

What is claimed is:

1. A zoom cell comprising:
   a main zoom cell body having a central axis,
   at least two fingers extending from the main zoom cell body parallel to the central axis, and
   at least two grooves separating the at least two fingers, wherein the at least two fingers and at least two grooves are not evenly disposed about the main zoom cell body, wherein the zoom cell has a width and an outer diameter, and
   wherein the aspect ratio as defined as the width/outer diameter is from 0.2 to 1.4.

2. The zoom cell of claim 1 having from two to ten fingers and from two to ten grooves.

3. The zoom cell of claim 1, wherein the at least two fingers and at least two grooves are evenly disposed about the main zoom cell body.

4. The zoom cell of claim 1, wherein one of the at least two grooves has a greater arc length than the other of the at least two grooves.

5. The zoom cell of claim 1, wherein the zoom cell has an aspect ratio from 0.3 to 1.2.

6. A zoom cell system comprising:
   an erector tube having an inner diameter, and
   at least two zoom cells positioned within the erector tube, each zoom cell having a main zoom cell body with a central axis, at least two fingers extending from the main zoom cell body parallel with the central axis and separated by at least two grooves, wherein each zoom cell has an outer diameter, as measured with reference to the outer surface of the fingers, which is the same, and further wherein at least one finger of each of the at least two zoom cells further includes a pin projecting outwardly away from the finger in a direction perpendicular to the central axis,
   wherein the at least two zoom cells are positioned within the erector tube such that the at least two fingers of a first zoom cell align with a corresponding at least one of the at least two grooves of the other of the at least two zoom cells.

7. The zoom cell system of claim 6, wherein the erector tube further includes at least two slots, and each of the pins of the at least two zoom cells engages a respective on of the two slots.

8. The zoom cell system of claim 6, wherein the at least two fingers are evenly disposed about the main zoom cell body.

9. The zoom cell system of claim 6, wherein the at least two fingers of a first of the at least two zoom cells are not evenly disposed about the main zoom cell body.

10. The zoom cell system of claim 6, wherein the at least two grooves have different arc lengths.

11. The zoom cell system of claim 6, wherein each of the at least two zoom cells have an aspect ratio from 0.3 to 1.2.

12. The zoom cell system of claim 6 comprising two zoom cells positioned within the erector tube, each zoom cell having a main zoom cell body with a central axis, two fingers extending from the main zoom cell body parallel with the central axis and separated by two grooves.

13. The zoom cell system of claim 12, wherein the two fingers of each of the two zoom cells further includes a pin projecting outwardly away from each finger in a direction perpendicular to the central axis.

14. A viewing optic comprising:
   a viewing optic body having an objective end, an eyepiece end, and a power ring for adjusting magnification; and
   a zoom cell system comprising
      an erector tube having an inner diameter, and
      at least two zoom cells positioned within the erector tube, each zoom cell having a main zoom cell body with a central axis, at least two fingers extending from the main zoom cell body parallel with the central axis and separated by at least two grooves, wherein at least one finger of each of the at least two zoom cells further includes a pin projecting outwardly away from the finger in a direction perpendicular to the central axis, wherein each zoom cell has an outer diameter as measured with reference to the outer surface of the fingers, wherein the at least two zoom cells are positioned within the erector tube such that the at least two fingers of a first zoom cell align with a corresponding at least one of the at least two grooves of the other of the at least two zoom cells, and wherein a power ring is operatively connected to the zoom cell system.

15. The viewing optic of claim 14, wherein the viewing optic is a scope.

16. The viewing optic of claim 14, wherein the erector tube further includes at least two slots, and each of the pins of the at least two zoom cells engages a respective one of the two slots.

17. The viewing optic of claim 14, wherein the at least two fingers of each of the at least two zoom cells further includes a pin projecting outwardly away from each of the at least two fingers in a direction perpendicular to the central axis.

* * * * *